United States Patent [19]

Rhoades, Jr. et al.

[11] 3,707,953
[45] Jan. 2, 1973

[54] IGNITION TIMING CONTROLLER FOR AN ENGINE

[75] Inventors: Warren A. Rhoades, Jr., Danville; Alfred R. Fleischer, Concord, both of Calif.

[73] Assignee: De Laval Turbine California, Inc.

[22] Filed: Feb. 5, 1971

[21] Appl. No.: 112,981

[52] U.S. Cl. ............................................. 123/117 R
[51] Int. Cl. ................................................ F02p 5/10
[58] Field of Search ...................... 123/117, 146.5 A

[56] References Cited

UNITED STATES PATENTS

| 2,670,724 | 3/1954 | Reggio | 123/117 A |
| 2,977,946 | 4/1961 | Larges | 123/117 A |
| 3,370,577 | 2/1968 | Guetersloh | 123/117 A |
| 1,483,883 | 2/1924 | Hillhouse | 123/117 A |

*Primary Examiner*—Laurence M. Goodridge
*Assistant Examiner*—Cort Flint
*Attorney*—Lothrop & West

[57] ABSTRACT

An internal combustion engine with variable spark ignition timing is provided with an air intake passage, an oil pressure system and a speed responsive device. To vary the ignition spark timing there is provided a housing enclosing primary and secondary levers connected to each other at one end by a link pivoted at opposite ends thereto. The primary lever has a fulcrum moved by the expansion of a chamber connected to the air intake passage and is in turn connected to a servo mechanism actuated by oil pressure and in turn varying the spark ignition timing. The secondary lever has a fixed fulcrum and at the other end from the link is connected to an expansible chamber responsive to the speed responsive device. In an alternate version the fixed fulcrum of the secondary lever is replaced by an expansible chamber connected to an engine temperature responsive device. In another version, the servo mechanism is overridden by a plunger responsive to the engine starting cycle. In a fuel injection engine, the servo mechanism output is connected to the fuel injection timer.

4 Claims, 5 Drawing Figures

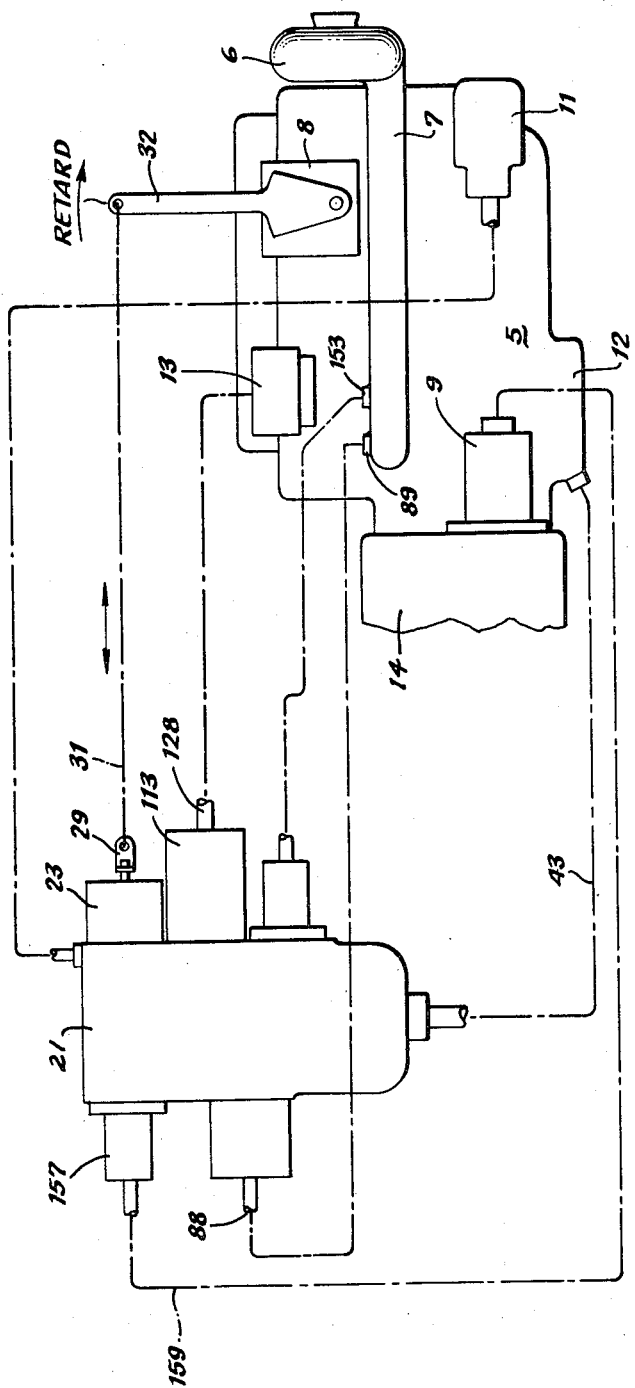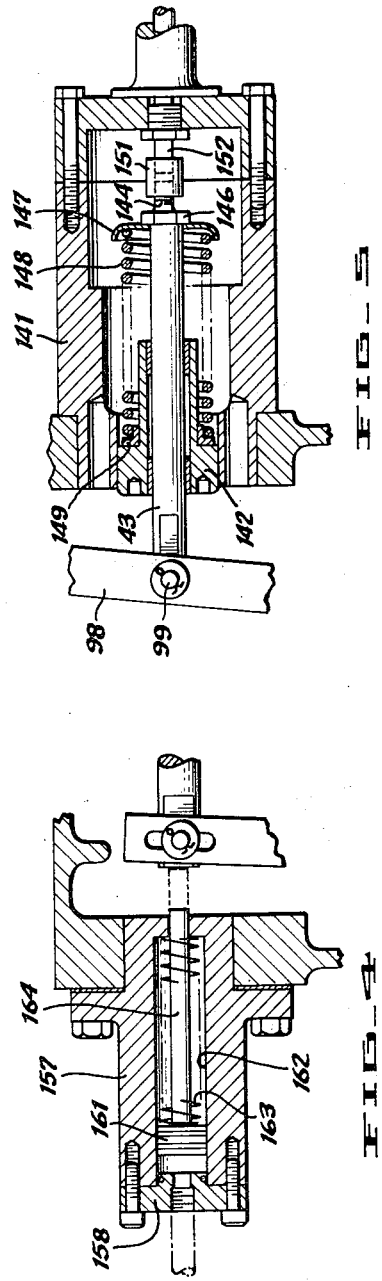

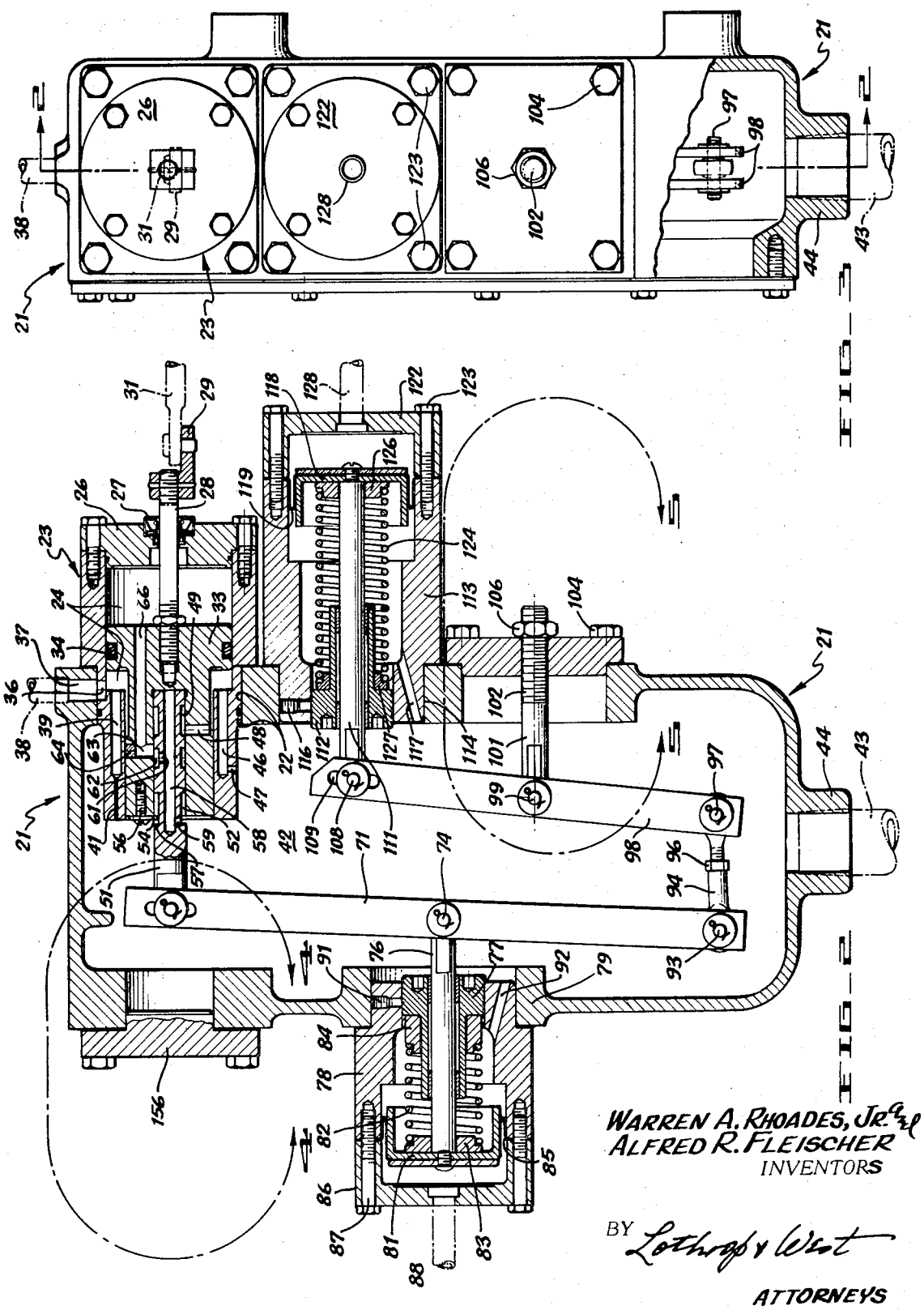

IGNITION TIMING CONTROLLER FOR AN ENGINE

In the operation of relatively large gas engines, particularly such engines which operate on natural gas in central stations and are equipped with spark ignition, there is a benefit to be obtained by timing the ignition to correspond exactly with any one or more of several factors involved in variable operation of the engine. For example, the engine operation is improved if the spark timing is especially coordinated with an increased load on the engine. In that event, it is helpful that the spark be retarded in accordance with the increase of load on the engine. Another factor is that with increasing temperature of the prospective combustion air, the spark not be left alone but rather be retarded. Furthermore, with increasing engine speed, it is helpful that the spark timing be somewhat advanced so that the initiation of combustion occurs soon enough to provide for maximum effect upon the piston.

In addition, it is considered to be quite helpful if the ignition timing is varied to retard the spark substantially during the engine starting cycle and immediately ensuing slow rotation of the engine. The same considerations apply in a fuel injection engine as to the timing of fuel injection but for simplicity herein, reference is generally to variation of spark ignition timing.

It is therefore an object of our invention to provide an internal combustion engine timing controller effective automatically to vary the timing in accordance with one or more of the instant, ambient conditions of the engine.

It is another object of our invention to provide a timing controller for an engine, as described, which is effective automatically to take into account various controlling factors; such as engine load, combustion air temperature, engine speed and perhaps engine starting, and to provide as a result an appropriate timing of the ignition event to afford a satisfactory and, in fact, optimum operation of the engine.

Another object of the invention is to provide a timing controller which is generally self-contained, susceptible to little or no variation in functioning over a protracted period of time, requires little or no servicing or adjustment, yet can be economically and satisfactorily produced.

Another object of the invention is to provide an internal combustion engine timing controller that can be initially set to correlate with a particular engine or a particular model of an engine and thereafter will not require any variation in order to produce satisfactory operation.

A further object of the invention is to provide a timing controller that can readily be adapted to standard versions of engines, particularly spark ignition engines of relatively large size, and will then automatically afford the desired results.

A still further object of the invention is in general to provide an appropriate automatic timing controller, especially for a spark ignition, internal combustion engine.

Other objects, together with the foregoing, are attained in the embodiments of the invention described in the accompanying description and illustrated in the drawings, in which:

FIG. 1 is a schematic diagram illustrating a spark ignition, internal combustion engine and various of its appurtenances and interconnections with a spark timing controller constructed pursuant to the invention;

FIG. 2 is a cross-section on a vertical, longitudinal plane through one simplified form of timing controller constructed pursuant to the invention;

FIG. 3 is a side elevation of the structure of FIG. 2, a portion being broken away to show the interior construction;

FIG. 4 is a detail showing in cross-section on the same plane as that of FIG. 2 a modified form of the invention in which there is a means for retarding the spark timing during engine starting; and FIG. 5 is a detail in cross-section on the same plane as FIG. 2, but illustrating a variation in the structure to accommodate variations in the temperature of the intake manifold air.

Although the ignition timing controller can be applied to many different kinds of engines and is adaptable to various different installations, it has been successfully employed in connection with the engine shown diagrammatically in FIG. 1. This is an internal combustion engine 5 having the usual construction embodying a supercharger 6 maintaining a super atmospheric pressure in an intake manifold 7 for supplying an appropriate combustible to the engine such as carburetted air or natural gas. The engine is supplied also with a spark ignition device 8. A starter 9, usually actuated by compressed air, is furnished for initially rotating the engine. Also included is an oil pump 11 mechanically driven by the engine, in most cases, and effective to supply lubricating oil under pressure to the various components of the engine and adjacent auxiliaries, the oil being taken from and restored eventually to a sump 12 normally located in the engine crank case. In addition, the speed of the engine may, if desired, be maintained or regulated by a standard governor, not shown. The engine is provided with a device 13 affording pneumatic pressure varying with or responsive to the engine speed. The engine likewise has a housing 14 usually enclosing a flywheel and a connection to the engine load.

Pursuant to the invention, means are provided for regulating the timing of the ignition device 8 so that the spark ignition occurs at an appropriate time in the cycle of the engine, depending upon the chosen, predetermined factors. These have been mentioned above. Some conditions of engine starting and some engine designs, particularly depending upon combustion chamber characteristics, engine starting speeds, fuels consumed and the like, may make it unnecessary to retard the spark timing during starting, but there are many instances in which such retardation is helpful.

At a convenient location with respect to the engine 5, there is provided an enclosing casing or housing 21 having an opening 22 therein within which is seated a capsule 23 or cell. This is of generally cylindrical form and defines a chamber 24 closed by an end cap 26 having a seal 27 through which extends a control rod 28. An appropriate connector 29 and a rod 31 join the rod 28 to a control lever 32 on the ignition device 8. For example, the arrangement is such that when the rod 31 moves toward the right in FIGS. 1 and 2 the ignition is retarded, and when the rod 31 is moved in the opposite direction the ignition timing is advanced.

Within the cell or capsule 23 the rod 28 is adjustably secured to a master piston 33 designed to reciprocate within the chamber 24 and sealed therein by means of a packing ring 34. The piston can reciprocate for substantially the full length of the chamber but always leaves uncovered an oil port 36 in registry with an oil passage 37 in the housing 21. Connected to the passage 37 is an oil pressure duct 38 leading from the oil pump 11. Whenever the pump 11 is actuated lubricating oil under pressure is available in the duct 38. The pressure oil flows through the opening 36 into the interior of the capsule and into the chamber 24 to provide pressure on the left-hand face of the piston 33.

Lubricating oil entering through the port 36 flows through a passage 39 having a restricted discharge channel 41 therein directed into the interior chamber 42 within the housing 21. This provides a lubricating oil mist or spray throughout the interior to lubricate all of the accessible parts. Falling mist and any leakage gather in the bottom portion of the chamber 42 and are discharged therefrom by gravity through a connector 43 joined to a threaded boss 44 and leading back to the engine sump 12 for recirculation by the oil pump 11.

The capsule 23 likewise has a bore 46 leading from the chamber 24 to the left of the piston to a directed, small discharge orifice 47 affording a secondary source of spray for the interior lubrication of the parts within the casing 21. The size of the orifices 41 and 47 is so small that pressure lubricant entering the chamber 24 into the left of the piston 33 is maintained at a substantial pressure above the atmosphere. This pressure is transmitted through a duct 48 to an annular valve groove 49 cut around the periphery of a pilot piston 51 designed to reciprocate within a corresponding bore 52 in the piston 33. The pistons 51 and 33 are axially restrained to limited motion by a retaining washer 54 and a fastener 56 operating in a recess 57 cut around the pilot piston 51.

Within the pilot piston is a central bore 58 at one end having a radial opening 59 subject to the atmospheric pressure existing within the casing 21. Intermediate its length the piston 51 has a radial opening 61 communicating with a groove 62 located about midway of the active portion of the pilot piston. The groove 62 is designed, in the position of the pilot piston shown, to communicate with a radial bore 63 in the piston 33. One end of the bore 63 is closed off by a plug 64. The bore 63 communicates through a channel 66 with the cylinder 24 to the right of the piston 33.

With this arrangement of the parts, pressure fluid is always present on the left-hand side of the piston 33. The tendency is to move the piston 33 toward the right if the chamber 24 on the right-hand side of the piston is connected to drain or atmosphere, to move the piston toward the left if the larger right-hand face of the piston 33 is also connected to incoming pressure, or to hold the piston stationary if there is no flow into or out of the right-hand chamber 24. In the position of the parts particularly shown in FIG. 2, the chamber 24 on the right-hand side of the piston 33 is in communication through the passage 66 and the bore 63 with the groove 62 which, through the opening 61 and the bore 58, is subject to the atmospheric pressure within the casing 21 through the port 59. The piston 33 thus moves to the right until such time as the edge of the opening 63 leaves the edge of the groove 62 and thus blocks further discharge through the passage 58. Thus, the piston 33 initially takes up a position with respect to the pilot piston 51 with the aperture 61 closed off by an adjacent land of the pilot piston.

The position of the pilot piston 51 is governed by a primary lever 71 through a connection including a pivot pin 72 operating in a slot 73 in the primary lever. The lever itself is mounted on a fulcrum pin 74 carried by a piston rod 76 guided within a bushing 77 screwed into a capsule 78 or cell mounted in a boss 79 formed as part of the casing 21. The piston rod 76 as it extends from the bushing 77 is joined to a piston body 81 urged in one direction by a coil spring 82 surrounding the rod 76 and at one end abutting a fitting 83 underlying the piston body 81. At the other end the spring 82 abuts a fitting 84 seated on the bushing 77. While the piston body 81 could have a sliding seal reciprocating in contact with the walls of the interior of the bushing, it is preferred to provide a flexible diaphragm 85 secured on the piston head 81 and likewise secured between the body of the capsule 78 and a cap 86 secured thereto by fastenings 87. The effect is to seal one end of the capsule interior from the other.

In accordance with the invention, the piston 81 is made responsive to pressure impressed thereon through a duct 88 leading to a pressure sensor 89 extending into the intake manifold 7 and sensitive to the pressure therein. As the pressure in the manifold increases, the pressure within the conduit 88 increases and this displaces the piston head 81 toward the right in FIG. 2 against the urgency of the spring 82. It is customary to provide an initial factory setting or adjustment of the response of this part of the structure; for example, to compensate for the altitude of a particular engine installation. This adjustment and any subsequent adjustment is made by rotating the threaded bushing 77 within the capsule 78 and then locking the rotated bushing in position by tightening a set screw 91. The set screw is preferably masked to prevent unauthorized tampering with the adjustment. The momentary pressure within the intake manifold 7 is thus responded to by a corresponding position of the piston 81 and of the rod 76 and particularly of the fulcrum pin 74. The movement of the piston 81 to the right is solely against the adjusted spring 82, the pressure within the right side of the capsule 78 being the same atmospheric pressure existing within the chamber 42 since there is a communicating duct 92 therebetween. In this fashion, the fulcrum pin 74 moves pursuant to manifold pressure and correspondingly moves the primary lever 71.

At its end opposite the slot 73, the primary lever 71 is connected by a pivot pin 93 to a link 94, having an adjustable connection 96, to a pivot pin 97 in the lower end of a secondary lever 98. In the form shown, the secondary lever 98 is carried by a fulcrum pin 99 at one end of a stud 101 having a threaded connection 102 to a capsule cap 103 secured to the casing 21 by fastenings 104 and held in adjusted position by a lock nut 106. Thus, the position of the fulcrum 99 can be set or varied in accordance with the preferences of the user.

The other end of the secondary lever 98 is connected by a pin 108 operating in a slot 109 to a piston rod 111 operating in a bushing 112 threaded into the inner end of a capsule 113 or cell fitting into an opening 114 in the casing 21 and after adjustment held in position by a set screw 116. The hollow interior of the capsule 113 is connected to the chamber 42 through a duct 117. The outer end of the piston rod 111 is joined to a piston head 118 against which a flexible diaphragm 119 is secured by a head plate 121, the diaphragm being clamped between the capsule body and a cover plate 122 secured in position by fasteners 123.

Interposed between the piston head 118 and the bushing 112 is a spring 124 resting against a spring holder 126 at one end and a spring holder 127 at the other end. By appropriate adjustment of the threaded bushing 112, the force of the spring 124 on the piston head 118 can be set as desired.

Pressure is transmitted to act against the piston head 118 through a conduit 128 connected to the engine speed responsive device 13. As the engine speed increases, increasing pneumatic pressure is transmitted by the device 13 through the conduit 128 to the capsule 113, thus tending to move the piston rod 111 and the upper end of the secondary lever 98 toward the left in FIG. 2. If the other piston rod 76 is considered to be stationary, for the moment, this movement of the piston rod 111 to the left with increasing speed rotates the secondary lever 98 counterclockwise about the fulcrum 99, and through the link 94 also rotates the primary lever 71 counterclockwise about the fulcrum 74. The counterclockwise rotation of the primary lever 71 draws the pilot piston 51 to the left and through the servo mechanism moves the rod 31 to the left, thus advancing the timing of the ignition device 8. The reason the servo mechanism so responds is that as the pilot piston 51 moves to the left the groove 49 subject to incoming lubricating oil pressure is put into communication with the bore 63 and the passage 66. Thus, pressure fluid flows through the duct 66 into the chamber 24 to the right of the piston 33, thus driving that piston to the left as previously described.

Upon a reverse operation; that is, when the engine slows down, as may occur under increased load, the speed responsive device 13 responds thereto and the pressure within the duct 128 is reduced, the spring 124 is effective to move the piston rod 111 toward the right, producing a clockwise rotation of the secondary lever 98 and of the primary lever 71. This moves the servo pilot piston 51 to the right. That motion connects the groove 62 with the bore 63 so that the pressure on the right-hand side of the piston 33 in the chamber 24 can discharge through the ducts 66 and 58 and through the drain 59. The continuously exerted pressure on the left-hand side of the piston 33 from the inlet 38 causes the piston 33 to move to the right, thus similarly translating the rod 31 and moving the ignition timing controlling lever 32 in a retard direction.

With the foregoing arrangement, there are two control instrumentalities which affect the timing. One is the pressure of the intake manifold gas or air which modulates the fulcrum 74 of the primary lever 71. The other is the speed responsive device 13 which modulates the position of the pin 108 of the secondary lever. It is the combined effect of these two factors which establishes exactly the ignition timing.

While these two modulating characteristics are sufficient under many circumstances, it is sometimes preferred to add a further modifying factor.

Another modulating factor is the temperature of the intake manifold interior. This is influenced not only by the operating temperature of the engine but more particularly by the temperature of the combustible, either gas or air or mixture, going through the intake manifold 7. As particularly shown in FIG. 5, there is provided a capsule 141 or cell which fits into the casing 21 in place of the cover plate 103 and in place of the stud 101. The capsule 141 has threaded thereinto a bushing 142 guiding a rod 143 at one end of which the pivot pin 99, acting as a fulcrum for the secondary lever 98, is supported. The rod 143 is continued to receive a threaded stud 144 locked in position by a nut 146. The nut abuts a spring keeper 147 at one end of a coil spring 148, the other end of which is seated on a washer 149 abutting the head of the bushing 142. The stud 144 is screwed into a coupling 151 joined to the end of a movable member 152 extending to a temperature responsive bulb (not shown) properly positioned in a fitting 153 and extending into the interior of the intake manifold 7.

With this arrangement, when the temperature in the manifold increases, the temperature fitting 151 translates the piston rod 143 to the left in FIGS. 2 and 5 and thus moves the fulcrum 99 of the secondary lever 98 to the left. In turn this moves the servo pilot piston 51 to the right toward a spark retard condition. When the temperature in the manifold changes in the other direction, i.e. drops, the rod 152 moves oppositely. The spring 148 then is effective to move the fulcrum pin 99 toward the right, and the spark is then advanced. With this arrangement, therefore, there are three individually variable modulating factors effective simultaneously to govern the time of occurrence of the ignition spark.

In those instances wherein it is advisable to retard the ignition timing during the starting operation, there is preferably provided an arrangement as illustrated in FIG. 4. The casing 21, instead of having a simple closure cap 156 opposite the end of the servo pilot piston 51 is rather provided with a capsule 157 or cell. The outer end of the capsule is closed by a cap 158 carrying a tube 159 extending to the engine starter 9. In most cases, the starter is actuated by compressed air. When the starter 9 is energized, pressure is produced within the tube 159 and is imposed upon a piston 161 reciprocable within the interior bore 162 of the capsule 157. This moves the piston against a return spring 163. The piston is on a rod 164, the free end of which protrudes in axial alignment with the servo piston rod 51.

Pressure within the tube 159 is sufficient to translate the piston 161 against the urgency of the spring 163 and the piston rod 164 by physical abutment moves the servo pilot piston 51 to the right. At this time the engine is not running and oil pressure from the pump 11 is not generally available. The pilot piston 51 by abutment moves the remainder of the servo mechanism in the capsule 23 physically to the right and thus also translates the rod 31 to the right, affording a substantial retardation of the ignition spark.

When the starter 9 is de-energized upon starting of the engine, then the pressure within the line 159 is also relieved and the spring 163 restores the piston rod 164 to its left-hand position, as shown in FIG. 4, and operation continues as previously described. If in some installations there is a separate supply of lubricating oil under pressure to the servo mechanism even before the engine starts, then the movement of the plunger or piston rod 164 against the servo piston rod 51 is effective through regular servo operation to move the rod 31 into the same starting position as previously described.

What is claimed is:

1. An ignition timing controller for an engine having an air intake passage, an engine speed responsive device, a lubricating oil pressure supply, and a variable spark timer comprising a primary lever, means forming a variable volume first cell with a movable first wall, means connecting the interior of said first cell to said air intake passage, means providing a first fulcrum connection between said first wall and said primary lever, means for connecting said primary lever to said variable spark timer including a servo mechanism, an actuating connection between said lubricating oil pressure supply and said servo mechanism, a secondary lever arranged substantially parallel to said primary lever, means providing a second fulcrum connection for said secondary lever, means forming a variable volume second cell with a movable second wall, means for connecting said second wall to said secondary lever, means connecting the interior of said second cell to said speed responsive device, and a link forming a pivot connection to said primary lever and to said secondary lever.

2. An ignition timing controller as in claim 1 including means in said servo mechanism for releasing oil from said lubricating oil pressure supply to said primary and secondary levers.

3. An ignition timing controller as in claim 1 including means for actuating said servo mechanism to urge said spark timer toward retard position.

4. An ignition timing controller as in claim 1 including a housing enclosing said primary and secondary levers and serving as a mounting for said first cell and said second cell.

* * * * *